United States Patent Office 3,424,325
Patented Jan. 28, 1969

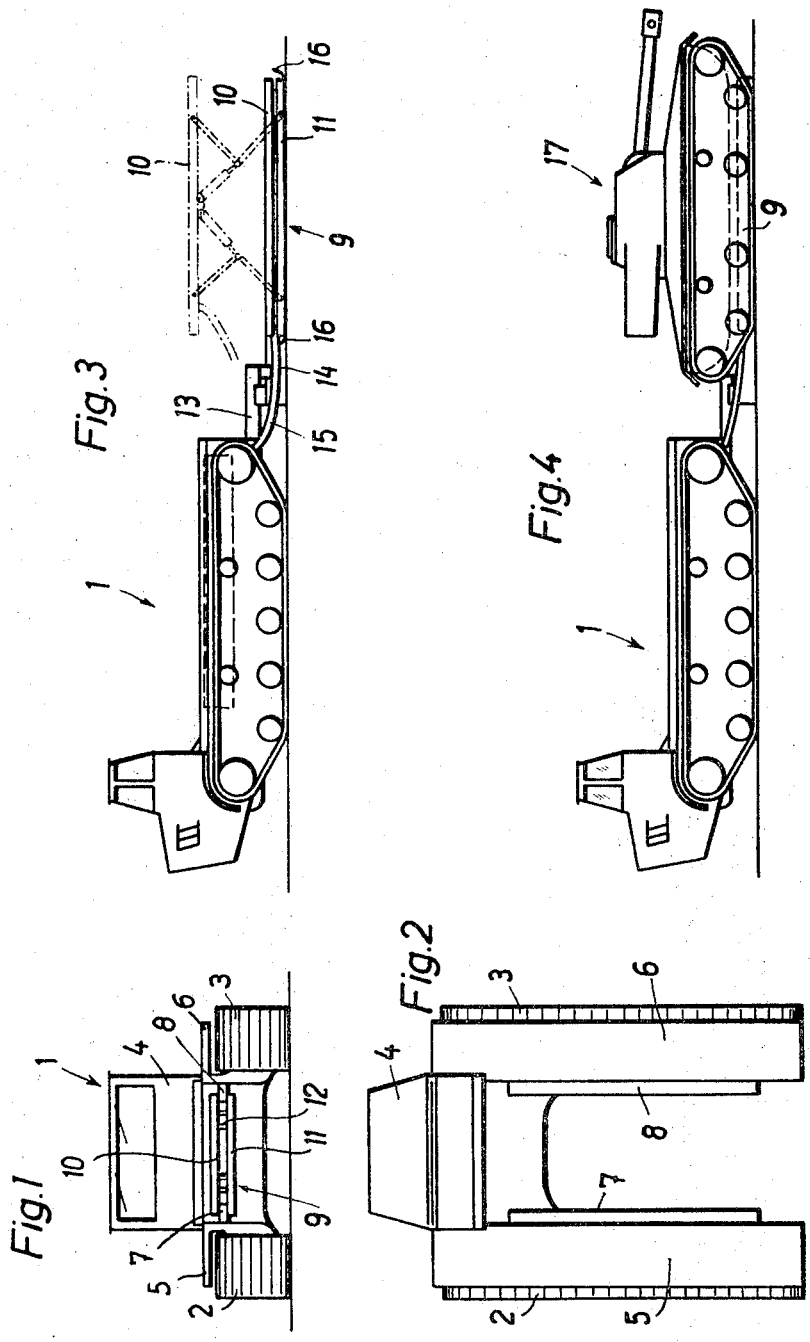

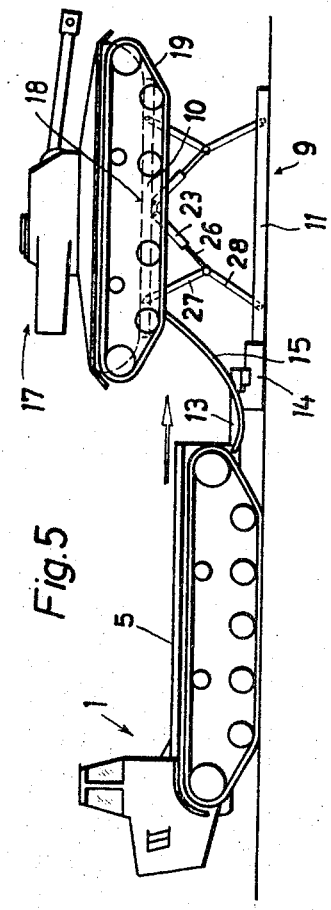
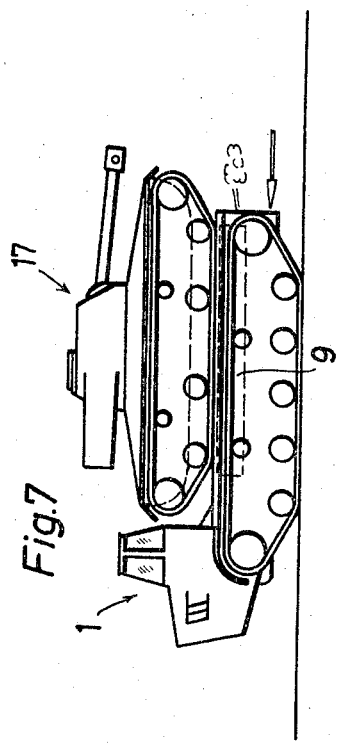
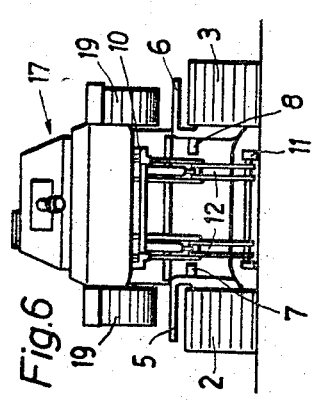

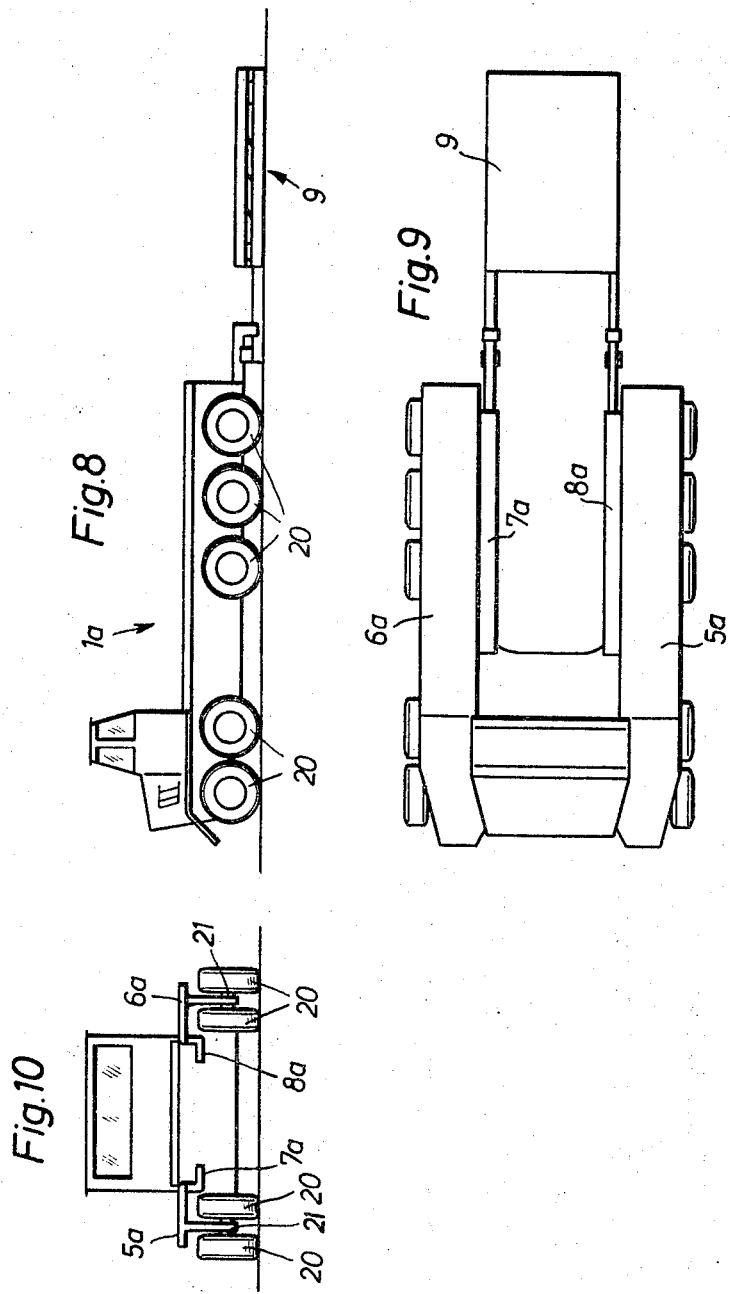

3,424,325
VEHICLE FOR RECOVERING DISABLED
VEHICLES
Benno Kaltenegger, Am Pleistalhof, Birlinghoven,
Kreis Siegburg, Germany
Filed July 18, 1966, Ser. No. 565,767
Claims priority, application Germany, July 20, 1965,
K 56,664
U.S. Cl. 214—390                    10 Claims
Int. Cl. B60p 3/00, 1/46, 1/02

ABSTRACT OF THE DISCLOSURE

A vehicle for recovering disabled vehicles wherein mechanism carried by the recovering vehicle is lowered to the ground and is moved under the disabled vehicle and raised to elevate the disabled vehicle and move the same to a supported position on the recovery vehicle.

---

This invention relates to a vehicle for recovering disabled or immobilized heavy-duty vehicles, such as tanks and similar track vehicles, and is particularly directed to a recovery vehicle which includes a lifting mechanism which is readily positioned beneath a disabled vehicle and is operative to rapidly transfer the disabled vehicle upon spaced support panels of the recovery vehicle.

Conventional recovery vehicles for recovering endless track or chain vehicles are generally of a relatively low profile or tow trailers which are provided with low supporting platforms. In either case the platform includes a ramp by means of which the disabled vehicle can be driven upon the platform. The recovery of disabled vehicles in this manner involves little difficulty so long as the disabled vehicle is itself mobile, i.e., can be driven onto the platform under its own power. If the disabled vehicle is completely immobile, particularly track-type vehicles, recovery is virtually impossible. Relatively small vehicles can in some cases be lifted on the platform of the recovery vehicle by means of a mobile crane or the like. In the case of really heavy-duty vehicles as, for example, a tank or bulldozer, the use of a crane is difficult, complicated, and the very cumbersome size of such a crane is prohibitive to successful vehicle recovery.

Where it is necessary to recover a tank in combat, heavy, slow moving crane mechanisms simply cannot be successfully employed. In the past it has been necessary under front-line combat conditions to use highly powered tanks to haul the immobilized lesser powered tanks. This type recovery is troublesome, and difficult because of the extremely high friction between the immovable tracks or treads of the immobilized vehicle and the ground.

In keeping with the above it is a primary object of the invention to provide a novel recovery vehicle which is devoid of the above and numerous other disadvantages, and is directed to a novel recovery vehicle which has a bifurcated supporting platform and a lifting panel or stage therebetween whereby a disabled vehicle is first raised above the level of the bifurcated platform, the recovery vehicle is moved to position the bifurcated platform beneath the tracks of the disabled vehicle, and the lifting panel is lowered to quickly and easily position the disabled vehicle upon the recovery vehicle for eventual movement therewith as may be required.

A further object of this invention is to provide novel means for supporting the lifting panel between the bifurcated panel in the non-recovery position of the recovery vehicle, and means for moving the lifting panel from its non-recovery position to a recovery position contiguous to the ground adjacent to the vehicle which is to be recovered.

Still another object of the invention is the provision of skids associated with the lifting panel to permit the lifting panel to be easily slid beneath the disabled vehicle, and hydraulic means for raising and lowering the lifting panel during a recovery operation.

The recovery vehicle of this invention will be fully disclosed immediately hereinafter with reference to the accompanying drawings, in which:

FIG. 1 is a rear view of a recovery vehicle constructed in accordance with this invention, and illustrates a lifting mechanism positioned in its non-recovery position between a bifurcated panel or bed of the vehicle;

FIG. 2 is a top plan view of the recovery vehicle of FIG. 1 with the lifting mechanism removed for clarity, and illustrates a pair of rails for supporting the lifting mechanism in its non-recovery position;

FIGS. 3 through 7 are views of the recovery vehicle and a disabled vehicle, and illustrate successive operations for positioning the disabled vehicle atop the bifurcated bed of the recovery vehicle;

Figure 11:
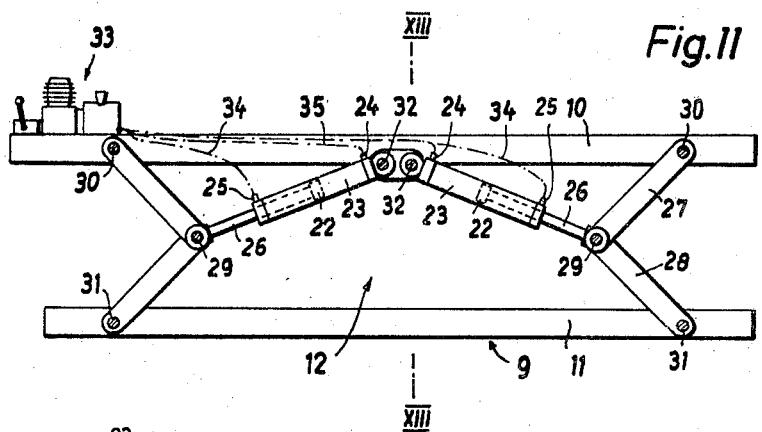
Figure 12:
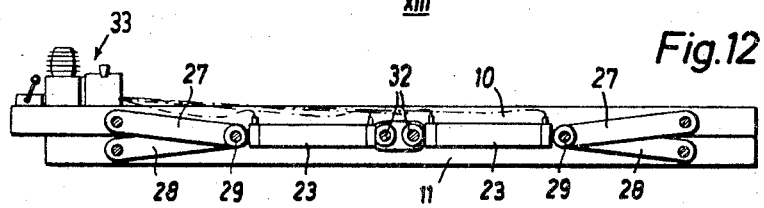
Figure 13:
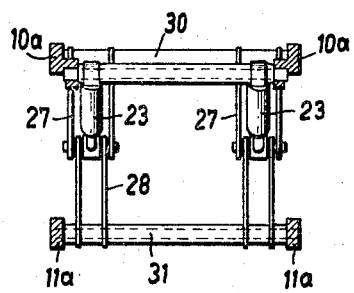

FIGS. 8 through 10 are highly schematic views of another recovery vehicle of this invention, and illustrate the use of wheels in lieu of endless tracks or chains as in the case of the vehicle of FIGS. 1 through 7; and FIGS. 11 through 13 illustrate the lifting mechanism of FIGS. 1 through 10 in detail, and more clearly illustrate the various components thereof.

A novel recovery vehicle for recovering heavy-duty track or trackless disabled vehicles is illustrated in FIGS. 1 through 7 of the drawings, and is generally designated by the reference numeral 1. The recovery vehicle 1 includes the usual endless chains or tracks 2, 3 which are driven by an engine (not shown) and a driver's cab 4. The vehicle 1 also includes a bifurcated or two-part load-bearing platform or bed defined by supporting panels 5 and 6. The supportig panels 5, 6 are relatively wide and are spaced from each other a distance such that the tracks or wheels of a vehicle to be recovered can be supported thereon. The panels 5, 6 may be of a one-piece construction or can alternately be individual elements interconnected by cross braces (unnumbered) at the forward end of the vehicle.

Supporting ledges or rails 7, 8 (FIGS. 1 and 2) are fixed to the respective panels 5, 6 at a position beneath the upper supporting surfaces (unnumbered) of the panels 5, 6, as is clearly illustrated in FIG. 1 of the drawings. A lifting mechanism 9 comprising an upper lifting panel 10, a lower panel 11, and a lifting unit 12 interconnecting the panels 10, 11 is carried by the vehicle 1 between the panels 5, 6. As will be more readily apparent hereinafter, the positioning of the lifting mechanism 9 between the panels 5, 6 and in supporting relationship relative to the rails 7, 8 permits the mechanism 9 to be easily transported by the vehicle 1.

A disabled or immobilized vehicle 17, such as a tank, is recovered in accordance with this invention by stopping the recovery vehicle 1 adjacent the vehicle 17 at a distance equal to at least the length of the lifting mechanism 9. With the lifting mechanism 9 in the position shown in FIG. 1 the lifting unit 12 is operated as a result of which the mechanism 9 is shifted to the solid outline position in FIG. 3 with the bottom panel 11 seated upon the ground. Consequently the lifting mechanism 9 rests on the ground in its extended position and is unsupported by the rails 7, 8 of the recovery vehicle. If the lifting mechanism 9 is extended to space the panels 10, 11 prior to moving the mechanism off the rails 7, 8 the mechanism 9 will then occupy the position shown in phantom outline in FIG. 3 and must be collapsed in a manner to be hereinafter described to the solid line position in FIG. 3 prior to the next step of the recovery operation.

The specific means for moving the lifting mechanism 9 from the non-recovery position (FIG. 1) to the recovery position (FIG. 4) can be accomplished by any number of conventional mechanisms and can be, for example, sliding linkages 13, 14 in the form of interconnected sliding rails. Suitable linkages (not shown) couple the rail 13 for movement from an uppermost position to the position shown in FIG. 3 after which the rail 14 can be slid to the right as viewed in FIG. 3 to the solid line position in this same figure.

With the aid of skids or slides 16 secured to each end of the bottom panel 11 the lifting mechanism 9 is positioned beneath the vehicle 17 by merely driving the vehicle 1 backward to the position shown in FIG. 4. The lifting mechanism 9 is then expanded and raised as a result of which the lifting panel 10 comes into contact with an undersurface 18 of the vehicle 17 which is then raised on continued actuation of the mechanism 9 until the lowermost run (unnumbered) of the disabled vehicle tracks 19 are above the panels 5, 6 (FIGS. 5 and 6). The vehicle 1 is then driven backward until the panels 5, 6 are beneath the tracks 19, during which the linkages 13, 14 move relative to the vehicle 1 toward the cabin 4. The vehicle 17 is then lowered by collapsing the mechanism 9 which brings the tracks into supporting contact with the panels 5, 6, the lifting panel 10 into contact with the upper surfaces of the rails 7, 8, and the bottom panel 11 into contact with the lower surface of the rails 7, 8. The panels 10, 11 can be mechanically locked together in the collapsed position and the vehicle 17 secured to the vehicle 1 before the latter is driven to deliver the vehicle 17 as desired.

The vehicle 17 is removed from the vehicle 1 by a reversal of the sequence of operations above-described. The vehicle 17 is first raised slightly by the expansion of the mechanism 9 so that the vehicle 1 can be driven forward. The vehicle 17 is then lowered by collapsing the mechanism 9 after which the now collapsed mechanism can be withdrawn from beneath the vehicle 17 by driving the vehicle 1 forward. The mechanism 9 is again expanded and the vehicle 1 is reversed to a position at which the mechanism 9 is between the panels 5, 6 with the panels 10, 11 disposed respectively above and below the rails 7, 8. The mechanism 9 is then again actuated causing the panel 10 to move downwardly into contact with the rails 7, 8 after which the continued actuation of the mechanism 9 raises the panel 11 into contact with the lower surfaces of the rails 7, 8.

Referring now to FIGS. 8 through 10, another vehicle 1a is shown which differs from the vehicle 1 in that, instead of the tracks 2, 3, the recovery vehicle 1a has a suitable number of double wheels 20. Panels 5a, 6a rest on axles 21 between the wheels 20 while ledges or rails 7a, 8a are fixed to the panels 5a, 6a. The lifting mechanism 9 is identical in each of the vehicles 1 and 1a.

The specific construction of the lifting mechanism 9 and the lifting unit 12 thereof is best illustrated in FIGS. 11 through 13 and includes a pair of upper girders or rails 10a, 10a and lower girders or rails 11a, 11a which are fixed to the panels 10, 11, respectively. The rails 10a seat upon the upper surfaces of the rails 7, 8 while the rails 11a seat against the lower surfaces of the rails 7, 8 in the collapsed position of the mechanism 9.

The lifting unit 12 is a hydraulic mechanism comprised of piston-cylinder units 22, 23 having hydraulic ports or couplings 24, 25. Piston rods 26 act through associated pivots or links 29 on pairs of toggle levers 27, 28 which are pivotally connected to the respective panels 10, 11 by pivot pins 30, 31, respectively. The piston-cylinder units 22, 23 are pivotally connected at 32 to either the rails 10a or the lifting panel 10. Hydraulic fluid can be selectively admitted to the units 23, 24 by means of a conduit 15 (FIG. 5) connected to a conventional fluid media pressure source (not shown) carried by the vehicle 1. Alternatively, a hydraulic unit 33 can be secured to either of the panels 10, 11 in which case suitable conduits 34, 35 are provided. In addition to the pivot pins 30, 31 spanning the respective rails 10a, 11a the rails 10a, 11a can be interconnected by means of plates or other suitable framework.

The recovery vehicle 1 may also be provided with twin sets of endless tracks lying one behind the other with the two individual vehicle sections being interconnected by a universal coupling. In the case of a wheeled vehicle a trailer carrying the panels 10, 11, the lifting mechanism 9, and the lifting unit 12 can be connected by a similar conventional universal joint to single axle drive of the vehicle. This construction is advantageous because of the small turning circle at a relatively short overall length.

While a preferred form of the invention has been fully set out heretofore, it is to be understood that variations thereof are deemed to be within the scope of this invention which is limited only as set forth in the following claims and equivalents thereof.

What is claimed is:

1. A vehicle for recovering and transporting disabled vehicles comprising a pair of spaced platforms defining a first space of a predetermined distance, a ledge secured to each platform, said ledges defining a second space of a predetermined distance less than the predetermined distance of the first space, separate lifting means normally disposed between said platforms, and said lifting means including an upper and a lower panel each of which is of a width less than the predetermined distance of said first space but greater than the predetermined distance of said second space.

2. The vehicle as defined in claim 1 wherein said upper panel is normally seated upon said ledges in the normal position of said lifting means and the lower panel is lifted up to the undersides of said ledges.

3. The vehicle as defined in claim 1 wherein said bottom panel is normally disposed beneath said ledges in the normal position of said lifting means and is movable to a second position in contact with the ground during a recovery operation.

4. The vehicle as defined in claim 1 wherein said upper lifting panel is normally seated upon said ledges in the normal position of said lifting means, the lower panel being normally disposed beneath said ledges in the normal position of said lifting means but is movable by the latter means to a second position in contact with the ground during a recovery operation, and said lifting means further including expansion and retraction means for moving said panels toward and away from each other.

5. The vehicle as defined in claim 1 wherein said platforms and ledges have upper surfaces, and the upper surfaces of said platforms are disposed above the upper surfaces of said ledges.

6. The vehicle as defined in claim 1 wherein said platforms define portions of a bed of said vehicle, said lifting means is joined to said bed by coupling means, and said coupling means being effective for moving said lifting means between a first position in said spaces and a second position adjacent an end of said bed.

7. The vehicle as defined in claim 3 wherein said panel is provided with skid means to facilitate the introduction of said lifting means beneath a disabled vehicle.

8. The vehicle as defined in claim 4 wherein toggle linkage means is connected between said panels, and said expansion and retraction means includes a hydraulic piston-cylinder mechanism operative to move said latter two panels toward and away from each other.

9. The vehicle as defined in claim 4 wherein said platforms are disposed above endless tracks for imparting movement to said vehicle.

10. The vehicle as defined in claim 8 wherein rails are fixed to said panels and said toggle linkage means is connected to said rails.

References Cited

UNITED STATES PATENTS

| | | | |
|---|---|---|---|
| 1,627,135 | 5/1927 | Ario | 214—38 |
| 2,048,580 | 7/1936 | Webber | 214—515 XR |
| 2,676,720 | 4/1954 | Noble | 214—515 |

ROBERT G. SHERIDAN, *Primary Examiner.*

U.S. Cl. X.R.

214—38, 75, 512